United States Patent
Cusin et al.

(10) Patent No.: US 10,384,309 B2
(45) Date of Patent: Aug. 20, 2019

(54) FABRICATION METHOD INCLUDING A MODIFIED MACHINING STEP

(71) Applicant: Nivarox-FAR S.A., Le Locle (CH)

(72) Inventors: Pierre Cusin, Villars-Burquin (CH); Davy Cretenet, La Chaux de Gilley (FR); Marc Stranczl, Nyon (CH); Raphael Garret, La Chaux-de-Fonds (CH)

(73) Assignee: Nivarox-FAR S.A., Le Locle (CH)

( * ) Notice: Subject to any disclaimer, the term of this patent is extended or adjusted under 35 U.S.C. 154(b) by 569 days.

(21) Appl. No.: 15/164,094

(22) Filed: May 25, 2016

(65) Prior Publication Data
US 2016/0368095 A1 Dec. 22, 2016

(30) Foreign Application Priority Data
Jun. 16, 2015 (EP) .................... 15172330

(51) Int. Cl.
| | |
|---|---|
| *B23K 26/32* | (2014.01) |
| *B23K 26/324* | (2014.01) |
| *G04B 17/34* | (2006.01) |
| *B23K 26/22* | (2006.01) |
| *B23K 26/322* | (2014.01) |
| *G04B 13/02* | (2006.01) |
| *B23K 103/08* | (2006.01) |

(52) U.S. Cl.
CPC .......... *B23K 26/324* (2013.01); *B23K 26/22* (2013.01); *B23K 26/322* (2013.01); *G04B 13/02* (2013.01); *G04B 17/34* (2013.01); *B23K 2103/08* (2018.08)

(58) Field of Classification Search
CPC ...... G04B 17/066; G04B 17/34; B23K 26/32; B23K 2103/18; B23K 26/324
See application file for complete search history.

(56) References Cited

U.S. PATENT DOCUMENTS

| | | | | |
|---|---|---|---|---|
| 3,218,794 A | * | 11/1965 | Baehni ................... | G04B 17/34 368/177 |
| 3,429,120 A | * | 2/1969 | Charpilloz ........... | G04B 17/345 368/177 |
| 7,435,377 B2 | * | 10/2008 | Cho ........................ | B22F 7/062 419/14 |
| 8,622,611 B2 | * | 1/2014 | Buhler ................. | G04B 17/066 368/175 |
| 9,235,193 B2 | * | 1/2016 | Niwa ..................... | G04B 17/22 |

(Continued)

FOREIGN PATENT DOCUMENTS

| | | |
|---|---|---|
| CH | 371 996 | 9/1963 |
| EP | 2 317 406 A1 | 5/2011 |

(Continued)

OTHER PUBLICATIONS

European Search Report dated Feb. 9, 2016 in European Application 15172330, filed on Jun. 16, 2015 ( with English Translation and Written Opinion).

*Primary Examiner* — Dana Ross
*Assistant Examiner* — Lawrence H Samuels
(74) *Attorney, Agent, or Firm* — Oblon, McClelland, Maier & Neustadt, L.L.P.

(57) ABSTRACT

The invention relates to a method for fabrication of a part intended to be welded comprising a final machining step capable of reducing the contact surface of the face to be welded.

12 Claims, 4 Drawing Sheets

(56) References Cited

U.S. PATENT DOCUMENTS

| | | | |
|---|---|---|---|
| 2007/0034416 A1* | 2/2007 | Cho | B22F 7/062 |
| | | | 175/434 |
| 2009/0236782 A1* | 9/2009 | Buhler | G04B 17/066 |
| | | | 267/85 |
| 2010/0149927 A1* | 6/2010 | Zaugg | G04B 17/066 |
| | | | 368/177 |
| 2011/0103200 A1 | 5/2011 | Cusin | |
| 2014/0241134 A1* | 8/2014 | Niwa | G04B 17/22 |
| | | | 368/127 |
| 2015/0344300 A1* | 12/2015 | Hessler | G04B 17/06 |
| | | | 216/33 |

FOREIGN PATENT DOCUMENTS

| | | | | |
|---|---|---|---|---|
| EP | 2 579 104 A2 | 4/2013 | | |
| FR | 2 254 054 | 7/1975 | | |
| FR | 2254054 A1 * | 7/1975 | | G04B 17/345 |
| WO | WO 2015/185423 A3 | 12/2015 | | |

* cited by examiner

FABRICATION METHOD INCLUDING A MODIFIED MACHINING STEP

This application claims priority from European Patent Application No 15172330.1 filed Jun. 16, 2015, the entire disclosure of which is hereby incorporated herein by reference.

FIELD OF THE INVENTION

The invention relates to a method for fabrication of a face intended to be welded and, more specifically, a face of this type having improved surface flatness.

BACKGROUND OF THE INVENTION

It is known from WO Publication No. 2015/185423 how to form a timepiece component from a part comprising a silicon-based or ceramic-based material which is welded by electromagnetic radiation directly onto another part, such as, for example, a metal or a metal alloy.

In the context of this development, it transpired that it was important for the gap between the parts not to exceed 0.5 micrometers, otherwise they could not be welded together.

SUMMARY OF THE INVENTION

It is an object of the present invention to overcome all of part of aforecited drawbacks by proposing a new fabrication method with at least one contact surface having improved flatness that enables parts to be assembled by welding.

To this end, according to a first embodiment, the invention relates to a method for fabrication of a timepiece component including the following steps:
   forming a first part made from metal and a second part made from silicon or from ceramic;
   mounting a surface of the first part on a surface of the second part;
   welding, by laser electromagnetic radiation, the surface of the first part mounted on the surface of the second part, in order to secure them to each other and to form said timepiece component;
characterized in that the step of forming the first part includes the following phases:
   taking a bar;
   profile turning the bar to form at least one diameter portion comprising a substantially vertical surface and a substantially horizontal surface;
   machining said substantially horizontal surface to form a flat surface for receiving said surface of the second part underneath the substantially horizontal surface.

According to the first embodiment, the fabrication method can offer a face with a perfectly flat perpendicular surface to ensure proper welding.

Further, according to a second embodiment, the invention relates to a method for fabrication of a timepiece component including the following steps:
   forming a first part made from metal and a second part made from silicon or from ceramic;
   mounting a surface of the first part on a surface of the second part;
   welding, by laser electromagnetic radiation, the surface of the first part mounted on the surface of the second part, in order to secure them to each other and to form said timepiece component;
characterized in that the step of forming the first part includes the following phases:
   taking a bar;
   profile turning the bar to form at least one diameter portion comprising a substantially vertical surface and a substantially horizontal surface;
   machining said substantially horizontal surface to reduce said substantially horizontal surface for receiving said surface of the second part.

According to the second embodiment, the fabrication method can advantageously offer a face with a reduced welding surface to diminish the gap between the parts to a value that ensures welding.

In accordance with other advantageous variants of the invention:
   the second part also includes at least a partial coating of metal, silicon oxide, silicon nitride, silicon carbide or an allotrope of carbon;
   the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof;
   the second part forms all or part of a case, a dial, a flange, a crystal, a bezel, a push-piece, a crown, a case back, a hand, a bracelet or strap, a balance spring, a balance wheel, a pallet-lever, a bridge, an oscillating weight, a wheel or an escape wheel.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

The invention relates to a component formed using a material having no usable plastic range i.e. with a very limited plastic range, with another part comprising the same type of material or a different type of material.

This component was devised for applications in the field of horology and is rendered necessary by the increasing part played by fragile, brittle materials, such as silicon-based or ceramic-based materials. It is possible, for example, to envisage forming a case, a dial, a flange, a crystal, a bezel, a push-button, a crown, a case back, a hand, a bracelet or strap, a balance spring, a balance wheel, a pallets, a bridge or bar, an oscillating weight or even a wheel, such as an escape wheel, entirely or partially from fragile or brittle materials.

Preferably, the silicon-based material used to make the compensated balance spring may be single crystal silicon, regardless of its crystal orientation, doped single crystal silicon, regardless of its crystal orientation, amorphous silicon, porous silicon, polycrystalline silicon, silicon nitride, silicon carbide, quartz, regardless of its crystal orientation, or silicon oxide. Of course, other materials may be envisaged, such as glass, ceramics, cermets, metals or metal alloys. Further, the first silicon-based part may also optionally include at least one partial coating of silicon oxide, silicon nitride, silicon carbide or an allotrope of carbon, depending upon the intended applications of the timepiece component.

As explained above, the other part may include the same type of material or another type of material. Therefore, preferably, the other part is metal-based and may include an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

Figure 1:
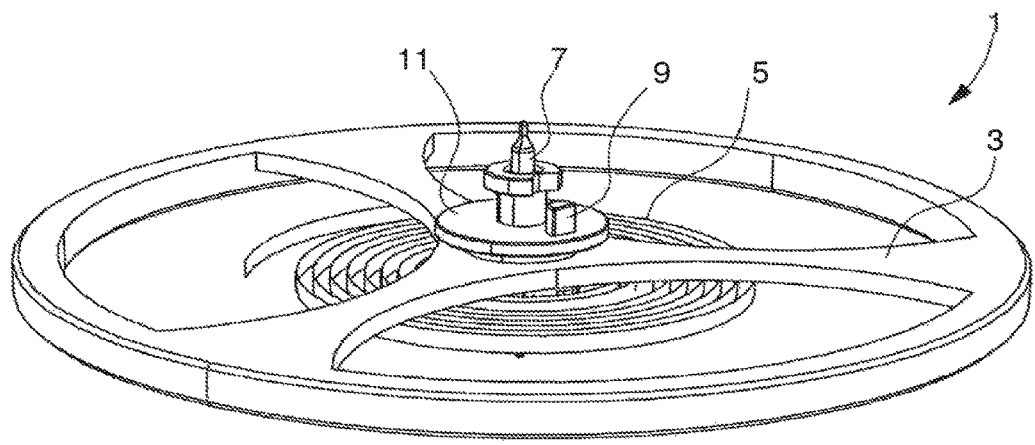
FIG. 1 is a perspective view of a sprung balance resonator.

For the sake of simplicity, the explanation below will concern an assembly between a balance spring and a balance staff. FIG. 1 shows a resonator 1 wherein the balance spring 5 is used for temperature compensation of the entire resonator assembly 1, i.e. all the parts and particularly the balance wheel 3 mounted on the same balance staff 7. Resonator 1 cooperates with a maintenance system, such as, for example, a Swiss lever escapement (not shown) cooperating with the impulse pin 9 of table-roller 11 which is also mounted on staff 7.

Figure 2:
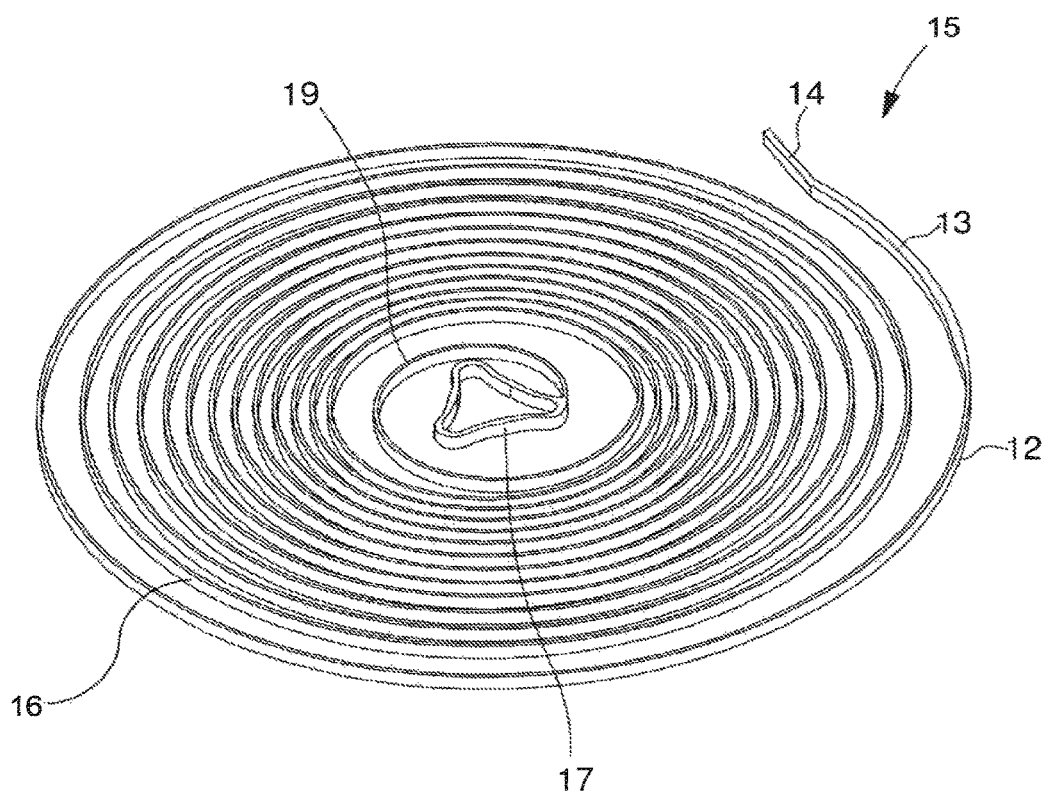
FIG. 2 is a perspective view of a balance spring according to the invention.

A compensating balance spring 15 is shown more clearly in FIG. 2. It includes a single strip 16 wound on itself between an inner coil 19 integral with a collet 17 and an outer coil 12 comprising an end 14 intended to be pinned up to the stud. As seen in FIG. 2, in order to improve the isochronism of the resonator in which balance spring 15 is used, the latter includes an inner coil 19 comprising a Grossmann curve and an outer coil 12 comprising a portion 13 that is thickened relative to the rest of balance spring 15. Finally, it can be seen that collet 17 comprises a single strip extending in a substantially triangular shape so that the collet exhibits elasticity when it is fitted onto the staff, in particular to enable it to be centred relative to the staff.

Figure 3:
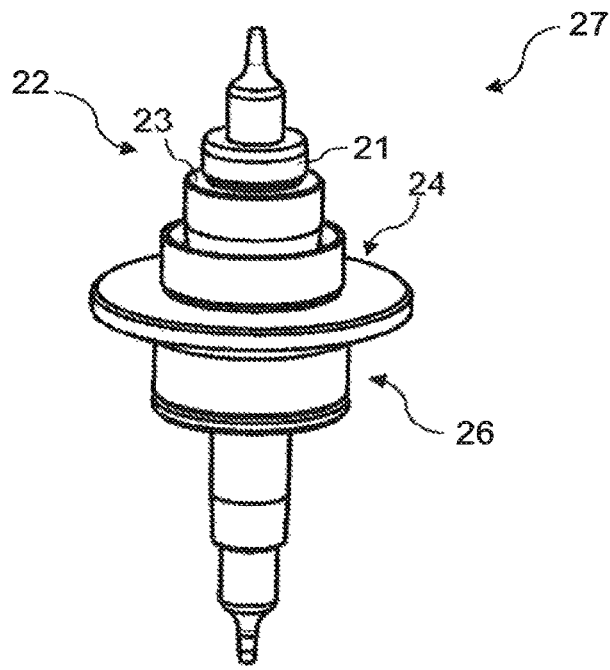
FIG. 3 is a perspective view of a balance staff according to the invention.

A staff 27 is illustrated more clearly in FIG. 3. It includes, in particular, several diameter portions 22, 24, 26 respectively intended to receive the balance spring, the balance wheel and the table-roller. As illustrated in FIG. 3, diameter portion 22 includes a cylindrical shaft 21, the lower portion of which is edged with a shoulder 23.

Figure 4:
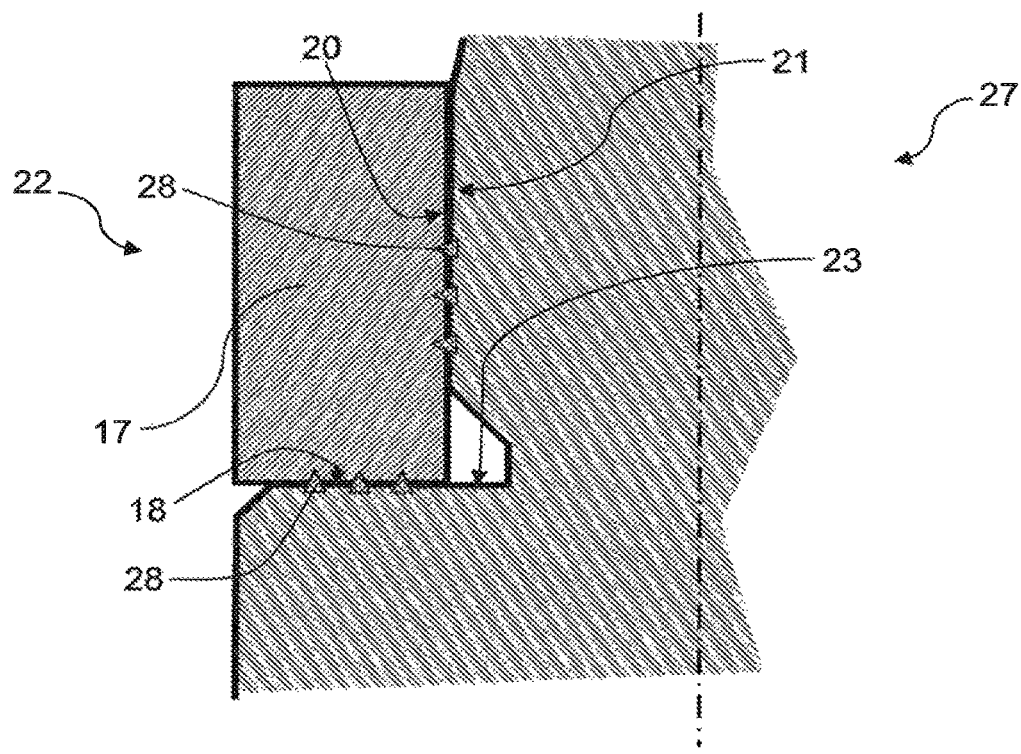
FIG. 4 is a cross-sectional view of an assembly according to WO Publication No. 2015/185423.

As illustrated in FIG. 4, diameter portion 22 is intended to receive, between shaft 21 and shoulder 23, collet 17 of balance spring 15. More specifically, the inner face 20 of collet 17 is resiliently pressed against the outer surface of shaft 21 and the lower face 18 of collet 17 is pressed against shoulder 23. Finally, as indicated at reference 28, shaft 21 and/or shoulder 23 is welded to collet 17 in accordance with the teaching of WO Publication No. 2015/185423.

However, within the context of developing the teaching of WO Publication No. 2015/185423, it very soon became clear that the gap between the parts must not exceed 0.5 micrometers, otherwise they cannot be welded.

According to a first embodiment, the fabrication method includes a first step comprising a final phase intended to machine the shoulder of the staff to provide a face with a perfectly flat, perpendicular surface and to reduce the gap to a value less than or equal to 0.5 micrometers.

The method according to the first embodiment of the invention therefore includes a first step comprising a first phase of taking a bar able to withstand profile turning. As the example relates to an assembly between a balance spring and a balance staff, the bar may be made from a metal or from a metal alloy.

Figure 5:
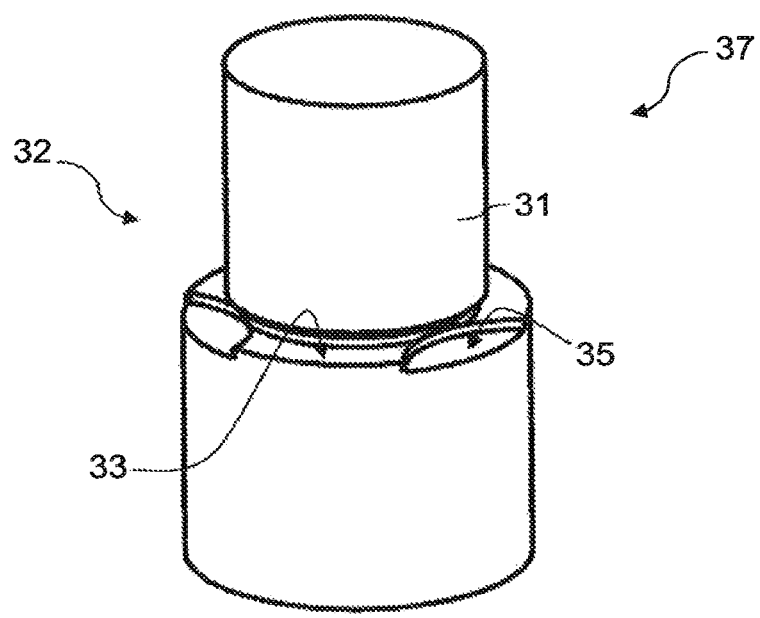
FIG. 5 is a perspective view of a staff according to a first embodiment of the invention.

The second phase is intended to turn the various diameter portions required to form balance staff 37 and particularly diameter portion 32 for receiving collet 17 or balance spring 15. In FIG. 5 it can be seen that diameter portion 32 includes a substantially vertical surface 31 forming a shaft and a substantially horizontal surface forming a shoulder 33.

The method may optionally continue with a phase of burnishing the substantially vertical surface 31 to increase its hardness and improve its surface state.

After the turning phase or the burnishing phase, the method, according to the first embodiment includes a final phase of machining said substantially horizontal surface so as to form a flat surface underneath the substantially horizontal surface forming shoulder 33. As seen in FIG. 5, the surface 35 thereby obtained is perfectly flat and perpendicular relative to shaft 31 to ensure the welding of the staff 37 to collet 17 of balance spring 15 onto the shaft 31 and/or the shoulder 33.

Thus, regardless of the preceding phases of the method, the final machining phase can ensure a perfectly flat surface 35 at the end of the method for receiving collet 17 of balance spring 15.

It is thus clear that, after a finishing step including, for example, a deburring step, the staff 37 obtained offers a perfectly flat welding surface ensuring welding with another part as taught in WO Publication No. 2015/185423.

Figure 6:
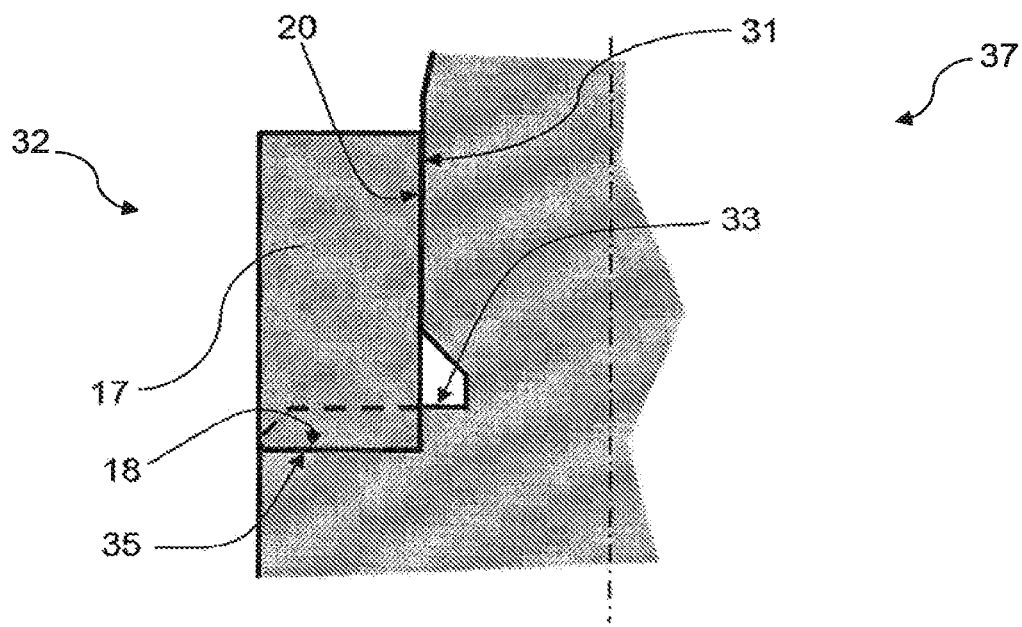
FIG. 6 is a cross-sectional view of an assembly according to a first embodiment of the invention.

The method continues with a step in which collet 17 is fitted onto diameter portion 32, i.e. the inner face 20 of collet 17 is resiliently pressed against the outer surface of shaft 31 and that the inner face 18 of collet 17 is pressed against surface 35 in a different plane from shoulder 33, as illustrated in FIG. 6. Finally, in a final welding step, the collet 17 is laser welded with the assurance that balance spring 15 and staff 37 are joined to each other.

According to a second embodiment, the fabrication method includes a first step comprising a final phase intended to machine the shoulder of the staff in order to provide a reduced welding surface to diminish the gap to a value less than or equal to 0.5 micrometers.

The method according to the second embodiment of the invention thus includes a first step comprising a first phase of taking a bar able to withstand profile turning. As the example relates to an assembly between a balance spring and a balance staff, the bar may be made from a metal or from a metal alloy.

Figure 7:
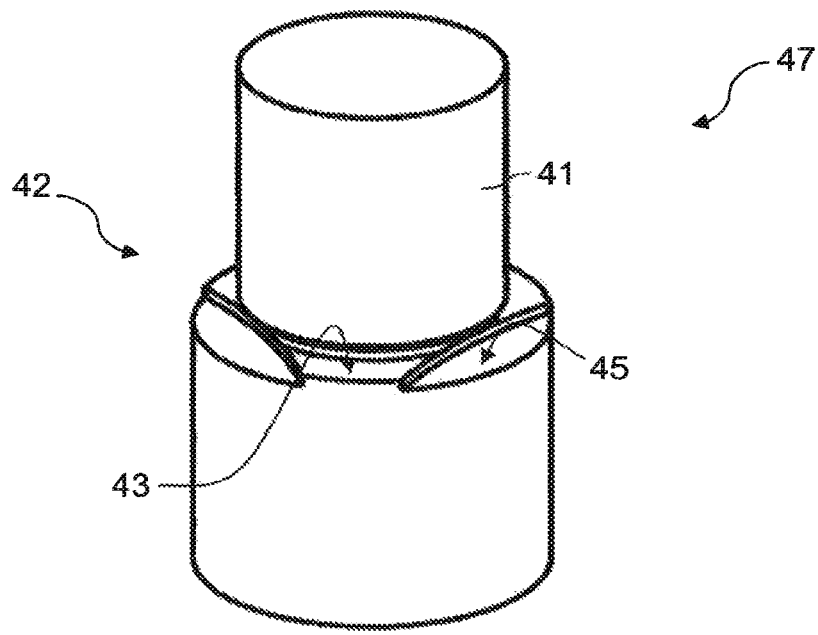
FIG. 7 is a perspective view of a staff according to a second embodiment of the invention.

The second phase is intended to turn the various diameter portions required to form balance staff 47 and particularly diameter portion 42 for receiving collet 17 or balance spring 15. In FIG. 7 it can be seen that diameter portion 42 includes a substantially vertical surface 41 forming a shaft and a substantially horizontal surface 43 forming a shoulder.

The method may optionally continue with a phase of burnishing the substantially vertical surface 41 to increase its hardness and improve its surface state.

After the turning phase or the burnishing phase, the method, according to the second embodiment, includes a final phase of machining the substantially horizontal surface so as to reduce said substantially horizontal surface forming shoulder 43. As seen in FIG. 7, the hollow 45 thereby obtained forms studs instead of a continuous shoulder 43 to ensure the welding of the staff 47 to collet 17 of balance spring 15 onto the shaft 31 and/or the shoulder 33.

It is thus clear that the staff 47 obtained offers discrete welding surfaces 42 having a reduced surface area to diminish the gap to a value less than or equal to 0.5 micrometers. Thus, after a finishing step including, for example, a deburring step, the staff 47 obtained offers welding surfaces 43 ensuring welding with another part as taught in WO Publication No. 2015/185423.

Figure 8:
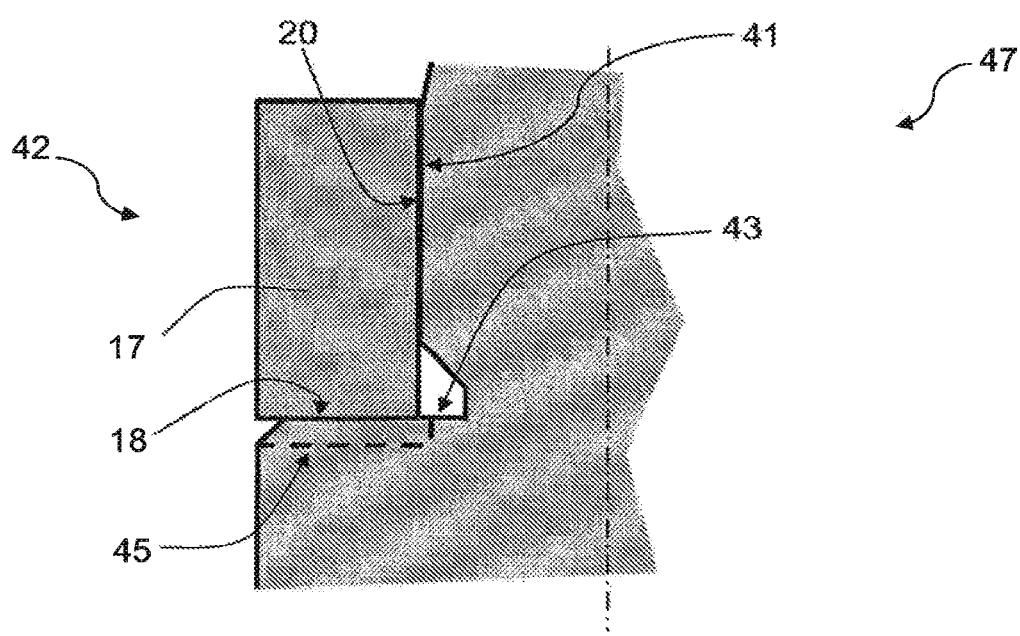
FIG. 8 is a cross-sectional view of an assembly according to a second embodiment of the invention.

The method continues with a step in which collet 17 is fitted onto diameter portion 42, i.e. the inner face 20 of collet 17 is pressed against the outer surface of shaft 41 and that the inner face 18 of collet 17 is pressed against shoulders 43 having a reduced surface area, as illustrated in FIG. 8. Finally, in a final welding step, the collet 17 is laser welded with the assurance that balance spring 15 and staff 47 are joined to each other.

Of course, this invention is not limited to the illustrated example but is capable of various variants and modifications which will appear to those skilled in the art. In particular, the method is not limited to the two embodiments set out in the present specification. Indeed, depending on the desired applications, it could be adapted to obtain different surfaces.

What is claimed is:

1. A method for fabrication of a timepiece component comprising the following steps:
    forming a first part made from metal and a second part made from silicon or ceramic;
    mounting a surface of the first part on a surface of the second part;
    welding, by laser electromagnetic radiation, the surface of the first part mounted on the surface of the second part, in order to secure the parts to each other and to form the timepiece component,
    wherein the step of forming the first part includes the following phases:
    taking a bar;
    profile turning the bar to form at least one diameter portion including a cylindrical shaft, the at least one diameter portion comprising a substantially vertical surface formed by an outer face of the cylindrical shaft and a substantially horizontal surface formed by a shoulder extending radially outward;
    machining the substantially horizontal surface to form a flat surface for receiving the surface of the second part underneath the substantially horizontal surface.

2. The method according to claim 1, wherein the second part also includes at least a partial coating of metal, silicon oxide, silicon nitride, silicon carbide or an allotrope of carbon.

3. The method according to claim 1, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

4. The method according to claim 1, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

5. A method for fabrication of a timepiece component comprising the following steps:
    forming a first part made from metal and a second part made from silicon or ceramic;
    mounting a surface of the first part on a surface of the second part;
    welding, by laser electromagnetic radiation, the surface of the first part mounted on the surface of the second part, in order to secure the parts to each other and to form the timepiece component;
    wherein the step of forming the first part includes the following phases:
    taking a bar;
    profile turning the bar to form at least one diameter portion including a cylindrical shaft, the at least one diameter portion comprising a substantially vertical surface formed by an outer face of the cylindrical shaft and a substantially horizontal surface formed by a shoulder extending radially outward;
    machining the substantially horizontal surface to reduce the substantially horizontal surface for receiving the surface of the second part.

6. The method according to claim 5, wherein the second part also includes at least a partial coating of metal, silicon oxide, silicon nitride, silicon carbide or an allotrope of carbon.

7. The method according to claim 5, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

8. The method according to claim 5, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

9. The method according to claim 1, wherein the mounting includes mounting the surface of the second part on the flat surface underneath the substantially horizontal surface of the first part and mounting a second surface of the second part against the substantially vertical surface of the first part.

10. The method according to claim 1, wherein the first part is a balance spring and the second part is a balance shaft and the mounting includes mounting a collet of the balance spring onto the balance shaft.

11. The method according to claim 5, wherein the mounting includes mounting the surface of the second part on the substantially horizontal surface of the first part and mounting a second surface of the second part against the substantially vertical surface of the first part.

12. The method according to claim 5, wherein the first part is a balance spring and the second part is a balance shaft and the mounting includes mounting a collet of the balance spring onto the balance shaft.

* * * * *